US010327228B2

(12) United States Patent
Maki

(10) Patent No.: US 10,327,228 B2
(45) Date of Patent: *Jun. 18, 2019

(54) SCALABLE WLAN GATEWAY

(71) Applicant: Huawei Technologies Co., Ltd., Shenzhen (CN)

(72) Inventor: Lasse Maki, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,405

(22) Filed: Sep. 20, 2017

(65) Prior Publication Data
US 2018/0014280 A1    Jan. 11, 2018

Related U.S. Application Data

(63) Continuation of application No. 13/924,110, filed on Jun. 21, 2013, now Pat. No. 9,883,487, which is a
(Continued)

(30) Foreign Application Priority Data

May 9, 2008  (FI) ...................................... 20080345

(51) Int. Cl.
*H04W 72/04*    (2009.01)
*H04W 12/06*    (2009.01)
(Continued)

(52) U.S. Cl.
CPC ........... *H04W 72/04* (2013.01); *H04W 12/06* (2013.01); *H04W 88/06* (2013.01); *H04W 84/12* (2013.01); *H04W 84/18* (2013.01); *H04W 88/04* (2013.01)

(58) Field of Classification Search
None
See application file for complete search history.

(56) References Cited

U.S. PATENT DOCUMENTS

| 7,002,933 B1 | 2/2006 | Poon et al. |
| 7,408,910 B2 | 8/2008 | Kimata et al. |

(Continued)

FOREIGN PATENT DOCUMENTS

| CN | 1586058 A | 2/2005 |
| CN | 1954554 A | 4/2007 |

(Continued)

OTHER PUBLICATIONS

Wei et al., "WWAN/WLAN Two-Hop-Relay Architecture for Capacity Enhancement," IEEE Communications Society, pp. 225-230. XP010708077, Institute of Electrical and Electronics Engineers, New York, New York (2004).

(Continued)

*Primary Examiner* — Kodzovi Acolatse
(74) *Attorney, Agent, or Firm* — Leydig, Voit & Mayer, Ltd.

(57) ABSTRACT

A technique for combining transmission bandwidths of several communication devices, such as mobile stations is disclosed. A master mobile station establishes a WLAN access point communicating with WLAN client terminals. One or more slave mobile stations may detect a predefined network identifier and join the WLAN network. The master as-signs IP addresses for the client terminals and slave mobile stations. The master also resolves DNS queries in cooperation with external DNS servers. Traffic, including internet packets, between the client terminals and various internet hosts is tunneled over multiple simultaneous transmission paths between the master and a multiplexing/demultiplexing computer. The inventive band-width combina- (Continued)

tion technique is transparent to the client terminals and the internet hosts.

12 Claims, 10 Drawing Sheets

Related U.S. Application Data continuation of application No. 13/240,468, filed on Sep. 22, 2011, now Pat. No. 8,493,951, which is a continuation of application No. 12/336,279, filed on Dec. 16, 2008, now Pat. No. 8,064,418.

(51) Int. Cl.
*H04W 88/06* (2009.01)
*H04W 84/12* (2009.01)
*H04W 84/18* (2009.01)
*H04W 88/04* (2009.01)

(56) References Cited

U.S. PATENT DOCUMENTS

| | | | |
|---|---|---|---|
| 7,441,043 B1 | 10/2008 | Henry et al. | |
| 7,450,554 B2 | 11/2008 | Zhang | |
| 7,577,142 B2 | 8/2009 | Kloth | |
| 7,650,148 B2 | 1/2010 | Kim et al. | |
| 7,751,403 B2 | 7/2010 | Kim et al. | |
| 7,801,100 B2 | 9/2010 | Agardh et al. | |
| 7,830,844 B2 | 11/2010 | Todd et al. | |
| 7,831,236 B2 | 11/2010 | Robertson et al. | |
| 7,849,177 B2 | 12/2010 | Uhlik | |
| 7,916,663 B2 | 3/2011 | Yee | |
| 8,032,174 B2 | 10/2011 | Kezys et al. | |
| 8,036,183 B2 | 10/2011 | Ptasinski et al. | |
| 8,036,191 B2 | 10/2011 | Kroselberg et al. | |
| 8,050,192 B2 | 11/2011 | Park | |
| 8,064,402 B2 | 11/2011 | Jun et al. | |
| 8,064,417 B2 | 11/2011 | Maki et al. | |
| 8,064,418 B2 | 11/2011 | Maki et al. | |
| 8,073,446 B2 | 12/2011 | Ishii et al. | |
| 2002/0069278 A1 | 6/2002 | Forslow | |
| 2002/0132632 A1 | 9/2002 | Brassil et al. | |
| 2003/0031151 A1 | 2/2003 | Sharma et al. | |
| 2003/0035397 A1 | 2/2003 | Haller et al. | |
| 2003/0165128 A1 | 9/2003 | Sisodia et al. | |
| 2004/0008653 A1 | 1/2004 | Cohen et al. | |
| 2004/0023665 A1 | 2/2004 | Simmonds et al. | |
| 2004/0077374 A1 | 4/2004 | Terry | |
| 2004/0125762 A1 | 7/2004 | Haller et al. | |
| 2004/0203836 A1 | 10/2004 | Gorday et al. | |
| 2004/0221046 A1 | 11/2004 | Heinonen et al. | |
| 2005/0030917 A1 | 2/2005 | Haller et al. | |
| 2005/0036468 A1 | 2/2005 | Miyabayashi et al. | |
| 2005/0043035 A1 | 2/2005 | Diesen et al. | |
| 2005/0078624 A1 | 4/2005 | Shu et al. | |
| 2005/0152305 A1* | 7/2005 | Ji | H04L 45/54 |
| | | | 370/328 |
| 2005/0163078 A1 | 7/2005 | Oba et al. | |
| 2005/0237962 A1 | 10/2005 | Upp et al. | |
| 2005/0286476 A1* | 12/2005 | Crosswy | H04W 76/10 |
| | | | 370/338 |
| 2005/0286546 A1* | 12/2005 | Bassoli | G11B 27/002 |
| | | | 370/432 |
| 2005/0288008 A1* | 12/2005 | Shimizu | H04B 7/022 |
| | | | 455/422.1 |
| 2006/0111045 A1* | 5/2006 | Orlassino | H04W 76/14 |
| | | | 455/41.2 |
| 2006/0123470 A1 | 6/2006 | Chen | |
| 2006/0126565 A1 | 6/2006 | Shaheen | |
| 2006/0126584 A1 | 6/2006 | Zhang et al. | |
| 2006/0126649 A1 | 6/2006 | Akiyoshi | |
| 2006/0135206 A1 | 6/2006 | Louks et al. | |
| 2006/0209876 A1* | 9/2006 | Liu | H04B 7/0695 |
| | | | 370/445 |
| 2006/0262794 A1* | 11/2006 | Livet | H04W 28/06 |
| | | | 370/390 |
| 2006/0291448 A1 | 12/2006 | Hellgren et al. | |
| 2007/0002833 A1 | 1/2007 | Bajic | |
| 2007/0008937 A1 | 1/2007 | Mody et al. | |
| 2007/0160023 A1 | 7/2007 | Wittmann | |
| 2007/0211714 A1 | 9/2007 | Metke et al. | |
| 2008/0062958 A1 | 3/2008 | Jonsson et al. | |
| 2008/0095080 A1 | 4/2008 | Danzeisen et al. | |
| 2008/0267152 A1 | 10/2008 | Alnas et al. | |
| 2009/0040954 A1 | 2/2009 | Usuba | |
| 2009/0067395 A1 | 3/2009 | Curtis et al. | |
| 2009/0279520 A1 | 11/2009 | Maki et al. | |
| 2009/0290561 A1 | 11/2009 | Kleindl | |
| 2010/0091660 A1 | 4/2010 | Morita | |
| 2010/0284388 A1* | 11/2010 | Fantini | H04W 48/18 |
| | | | 370/338 |
| 2010/0317403 A1 | 12/2010 | Mizuo | |
| 2011/0177805 A1 | 7/2011 | Maki et al. | |
| 2012/0008612 A1 | 1/2012 | Maki et al. | |
| 2012/0010521 A1 | 1/2012 | Maki et al. | |
| 2012/0257610 A1 | 10/2012 | Maki et al. | |
| 2013/0039216 A1 | 2/2013 | Maki | |
| 2013/0121197 A1 | 5/2013 | Maki | |
| 2013/0343257 A1 | 12/2013 | Maki | |

FOREIGN PATENT DOCUMENTS

| | | |
|---|---|---|
| CN | 102017528 A | 4/2011 |
| DE | 102005051291 A1 | 5/2007 |
| EP | 1061694 A2 | 12/2000 |
| EP | 1914954 A1 | 4/2008 |
| GB | 2389003 B | 9/2004 |
| GB | 2407003 B | 8/2006 |
| JP | 200358059 A | 12/2000 |
| JP | 2002165277 A | 6/2002 |
| JP | 2002330141 A | 11/2002 |
| JP | 2004147159 A | 5/2004 |
| JP | 2005189154 A | 7/2005 |
| JP | 2005523604 A | 8/2005 |
| JP | 2005348397 A | 12/2005 |
| JP | 2006191514 A | 7/2006 |
| JP | 2007053627 A | 3/2007 |
| JP | 2007087720 A | 4/2007 |
| JP | 2007129521 A | 5/2007 |
| JP | 2007329768 A | 12/2007 |
| JP | 2008503980 A | 2/2008 |
| JP | 2008167024 A | 7/2008 |
| JP | 2009055326 A | 3/2009 |
| JP | 2011512068 A | 4/2011 |
| KR | 20060019707 A | 3/2006 |
| KR | 20060048042 A | 5/2006 |
| KR | 100638439 B1 | 10/2006 |
| KR | 20110021735 A | 3/2011 |
| WO | 2004075583 A1 | 9/2004 |
| WO | 2005011183 A2 | 2/2005 |
| WO | 2005036836 A1 | 4/2005 |
| WO | 2006088135 A1 | 8/2006 |
| WO | 2006094256 A1 | 9/2006 |
| WO | 2007096884 A2 | 8/2007 |
| WO | 2009090295 A1 | 7/2009 |
| WO | 2009135986 A1 | 11/2009 |

OTHER PUBLICATIONS

"MDA Pro User Manual," retrieved from http://www.skytel.co.cr/microsoft/research/acrobat/050810.pdf, pp. 1-204, XP55040238, (Aug. 10, 2005).
U.S. Appl. No. 13/924,110, filed Jun. 21, 2013.
U.S. Appl. No. 13/240,468, filed Sep. 22, 2011.
U.S. Appl. No. 12/336,279, filed Dec. 16, 2008.
U.S. Appl. No. 13/648,249, filed Oct. 9, 2012.

* cited by examiner

SCALABLE WLAN GATEWAY

CROSS-REFERENCE TO RELATED APPLICATIONS

This application is a continuation application of U.S. patent application Ser. No. 13/924,110, filed on Jun. 21, 2013, which is a continuation application of U.S. patent application Ser. No. 13/240,468, filed on Sep. 22, 2011, now U.S. Pat. No. 8,493,951, which is a continuation of U.S. patent application Ser. No. 12/336,279, filed on Dec. 16, 2008, which issued as U.S. Pat. No. 8,064,418 on Nov. 22, 2011, and claims priority to Finish Patent Application No. 20080345, filed May 9, 2008, all of which are hereby incorporated by reference in their entirety.

FIELD OF THE INVENTION

Embodiments of the invention relate to methods, apparatuses and software products for providing a wireless broadband internet connection via a mobile communication network. In the context of the present invention, a broadband connection means a connection capable of transmitting traffic, in good network conditions, faster than a V.90 modem can, or faster than 64 kilobits per second.

BACKGROUND OF THE INVENTION

Wireless broadband modems can be used to couple personal computers or client terminals to the internet in places where wired internet connections or local-area networks are not available. Prior art wireless broadband modems exhibit certain problems. For instance, sharing a single wireless broadband connection among several users (client terminals) is awkward at best. Normally this requires setting up one of several client terminals as a master terminal that provides the internet connection to the remaining client terminals. This process consumes resources of the master terminal and the client terminals cannot operate without the master. The difficulty of sharing a single wireless broadband connection among several users is understandable in view of the fact that most wireless broadband modems are given or sold at a nominal cost by mobile network operators in connection with a network subscription. The network operators' obvious desire is to sell a subscription to each user instead of sharing a single connection among several users. Another problem of prior art wireless broadband modems is the fact that most of them are "wireless" only towards the mobile network and the connection to the client terminal takes place via a USB cable. The wired connection is actually a benefit in connection with fixed client terminals, such as home computers, because the wired connection can also supply power to the wireless broadband modem, but in connection with mobile client terminals, the wired nature of the USB connection is a definite handicap. Yet another problem is that the bandwidth provided by the mobile station and access network may be insufficient, particularly when several client terminals share a single wireless broadband connection.

SUMMARY OF THE INVENTION

An embodiment of the present invention provides a mobile station. The mobile station provides network access over a wireless local area network (WLAN) for a WLAN client terminal with a second mobile station. The mobile station comprises a memory for storing applications, a processor coupled with the memory for executing applications stored thereon, a WLAN circuitry for establishing the WLAN, and an application stored on the memory including instructions executable to the processor. The instructions that when executed instruct the processor to activate the WLAN; receive, from the WLAN client terminal via the WLAN, a first data packet including address information of an internet host; forward the first data packet to the second mobile station via the WLAN; and instruct the second mobile station to send the first data packet to the internet host according to the address information.

Another embodiment of the present invention provides a method. The method is executed by a mobile station for providing network access over a wireless local area network (WLAN) to a WLAN client terminal. The method comprises: establishing a WLAN; receiving, from the WLAN client terminal via the WLAN, a first data packet including address information of an internet host; forwarding the first data packet to a second mobile station via the WLAN; and instructing the second mobile station to send the first data packet to the internet host according to the address information.

BRIEF DESCRIPTION OF THE DRAWINGS

In the following the invention will be described in greater detail by means of specific aspects and embodiments with reference to the attached drawings, in which.

DETAILED DESCRIPTION OF THE EMBODIMENTS

Figure 1:
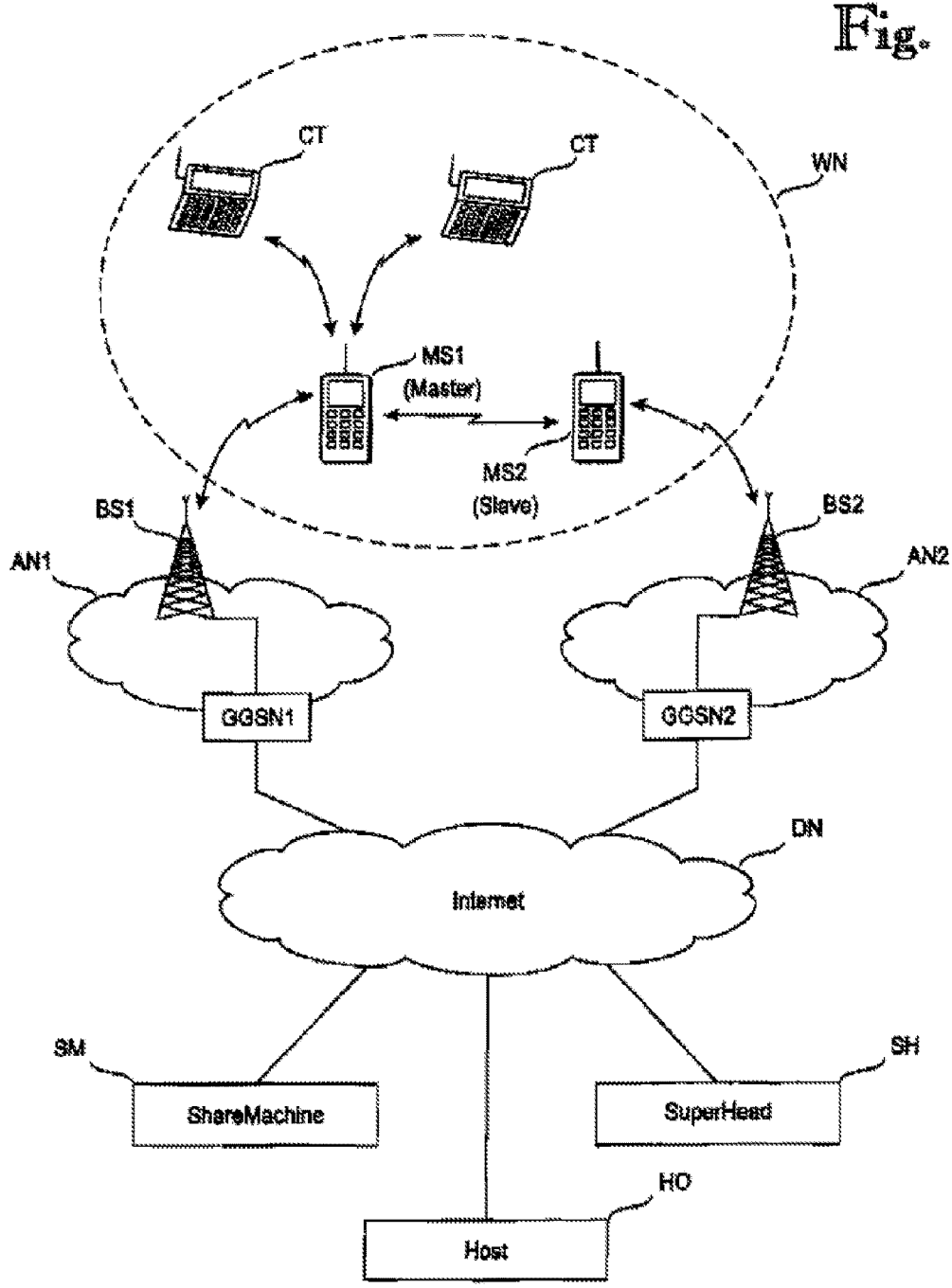
FIG. 1 is a schematic view of a general network architecture in which the invention can be used.

FIG. 1 is a schematic view of a general network architecture in which the invention can be used. Reference documents 1 and 2 (commonly owned patent applications, unpublished at the filing date of the present application, which is why some key sections of their contents are repeated here) disclose a technique in which mobile station MS establishes an ad-hoc WLAN network WN and acts as a gateway for providing a single communication path between one or more client terminals CT and an internet host HO. The communication path extends via an access network AN1 and a data network DN to the host HO. It is the purpose of the present invention to provide a mobile station MS which is operable to establish a scalable gateway between one or more client terminals CT, each of which communicates with a respective internet host.

As used herein, a gateway means an interface point between one or more WLAN client terminals on one hand and one or more mobile access networks on the other hand. A scalable gateway means a gateway arrangement which is capable of providing a dynamically varying number of simultaneous parallel transfer paths over one or more mobile access networks, such that data packets belonging to the same internet connection between a client terminal) and the host are multiplexed (combined) and demultiplexed (divided) at the ends of the simultaneous parallel transfer paths.

According to the present invention, the scalable gateway is established and managed by a master mobile station MS1. The scalable gateway established by the master mobile station MS1 may be subsequently joined and supported by zero or more slave mobile stations MS2. A slave mobile station MS2, when present, may join the WLAN network WN established by the master mobile station MS1 and support its operation by providing multiple radio interface paths, thus increasing bandwidth. Slave mobile stations MS2 may also detach from the gateway without causing any other harm than a corresponding reduction in bandwidth. The expression "zero or more slave mobile stations" means that the master mobile station MS1 can provide gateway operations by itself, but increased bandwidth may be provided by one or more slave mobile stations MS2.

The master and slave mobile stations MS1, MS2 can be identical in terms of hardware and software, and any mobile station in which the inventive scalable gateway application is executed first checks if an ad-hoc WLAN network is already established by another mobile station. For example, WLAN networks offering the inventive gateway functionality can be detected on the basis of the WLAN SSID identifier. If the mobile station detects an already-established WLAN network, it assumes the role of a slave mobile station. If an already-established ad-hoc WLAN network is not detected, the inventive mobile station establishes the WLAN network itself and assumes the role of the master mobile station for that WLAN network. For reasons of clarity, FIG. 1 shows only one slave mobile station MS2, but the invention is not restricted to any particular number of mobile stations.

The invention is ideally implemented such that the master mobile station MS1 and slave mobile station(s) MS2 are coupled to different base stations BS1, BS2, .... Operation via multiple different base stations helps ensure that the cellular radio interfaces between mobile stations and base stations do not constitute bottlenecks. For instance, such coupling to different base stations can be ensured by providing the various mobile stations MS1, MS2 with SIM cards (Subscriber Identity Module) of different access network operators. The access networks AN1, AN2 typically comprise gateway GPRS support nodes GGSN1, GGSN2 for connecting to data networks DN, such as the internet.

Because different packets transmitted between a client terminal CT and a host HO may be propagated via multiple base stations BS1, BS2 and access networks AN1, AN2, rules and schemes for packet routing must be defined. For instance, it must be decided whether packets transmitted via the multiple base stations and access networks are routed at the client terminal(s) CT or the mobile station(s) MS1, MS2. Currently there are commercially available mobile stations, which are provided with WLAN client software, and one way to implement packet routing is to perform the routing in the client terminal(s) CT, such that a transmitting client terminal sends packets to the first available mobile station, the next packet to the next available mobile station, and so on. A benefit of this routing scheme is that it eliminates packet forwarding among the mobile stations. On the other hand, implementing the packet routing in the client terminal (s) requires modifications to the protocol stacks in the client terminal(s), which is why the present invention is based on the idea that packet routing via the multiple mobile stations MS1, MS2 is performed in the mobile stations. Performing packet routing in the mobile stations provides the benefit that the scalable gateway is almost completely transparent to the client terminal(s), and—as seen from the client terminal (s)—the only change caused by the invention is increased bandwidth.

It is worth noting that performing packet routing in the mobile stations is far from trivial, however. This means that the mobile stations must send, or they should send, individual packets to one another. But a large portion of currently available smart telephones are based on Symbian® 60 or 80 platforms, and current implementations of Symbian® 60 or 80 platforms do not support it. In other words, mobile stations based on Symbian® 60 or 80 platforms cannot send individual packets to one another over the WLAN network. This limitation could be overcome by performing the packet routing in the client terminal(s) but, as stated earlier, this requires modifications to the protocol stacks. The inventor has found out, however, that it is not necessary to send the packets as point-to-point transmissions, and the limitation of Symbian® 60 or 80 platforms can be overcome by sending the packets in multicast transmissions, as will be explained in more detail in connection with FIGS. 7 and 8.

FIG. 1 shows a simplified network architecture in the sense that only one specimen of most elements is displayed. In practice, there will be several ad-hoc WLAN networks WN, each comprising one master mobile station MS1 and a varying number of slave mobile stations MS2. Each ad-hoc WLAN network WN supports a varying number of client terminals CT, each of which may have multiple internet connections to various internet hosts HO. This means that there is a many-to-many mapping among several of the network elements. The invention is implemented such that its operation is transparent to the ends of the connections, that is, to the client terminals and the hosts, and any multiplexing and demultiplexing operations (necessitated by the scalability) are performed by the master mobile stations MS1 and multiplexing/demultiplexing computers, which are called ShareMachine computers SM. The primary task of the SuperHead computers is to keep track of available ShareMachine computers SM.

Various measures may be taken to enhance data security and overall system robustness. For instance, virtual private network (VPN) technology may be utilized for some legs of the connections between the client terminals CT and the internet hosts HO. In one implementation, a VPN is established for each connection section between a mobile station MS1, MS2 and a ShareMachine computer SM. In this implementation the client terminals CT and the internet hosts HO do not need to establish the VPN and, apart from the increased bandwidth, the invention is transparent to them. System robustness may be enhanced by implementing the ShareMachine and SuperHead computers SM, SH in a distributed manner, as will be explained in detail in connection with FIG. 9.

Figure 2:
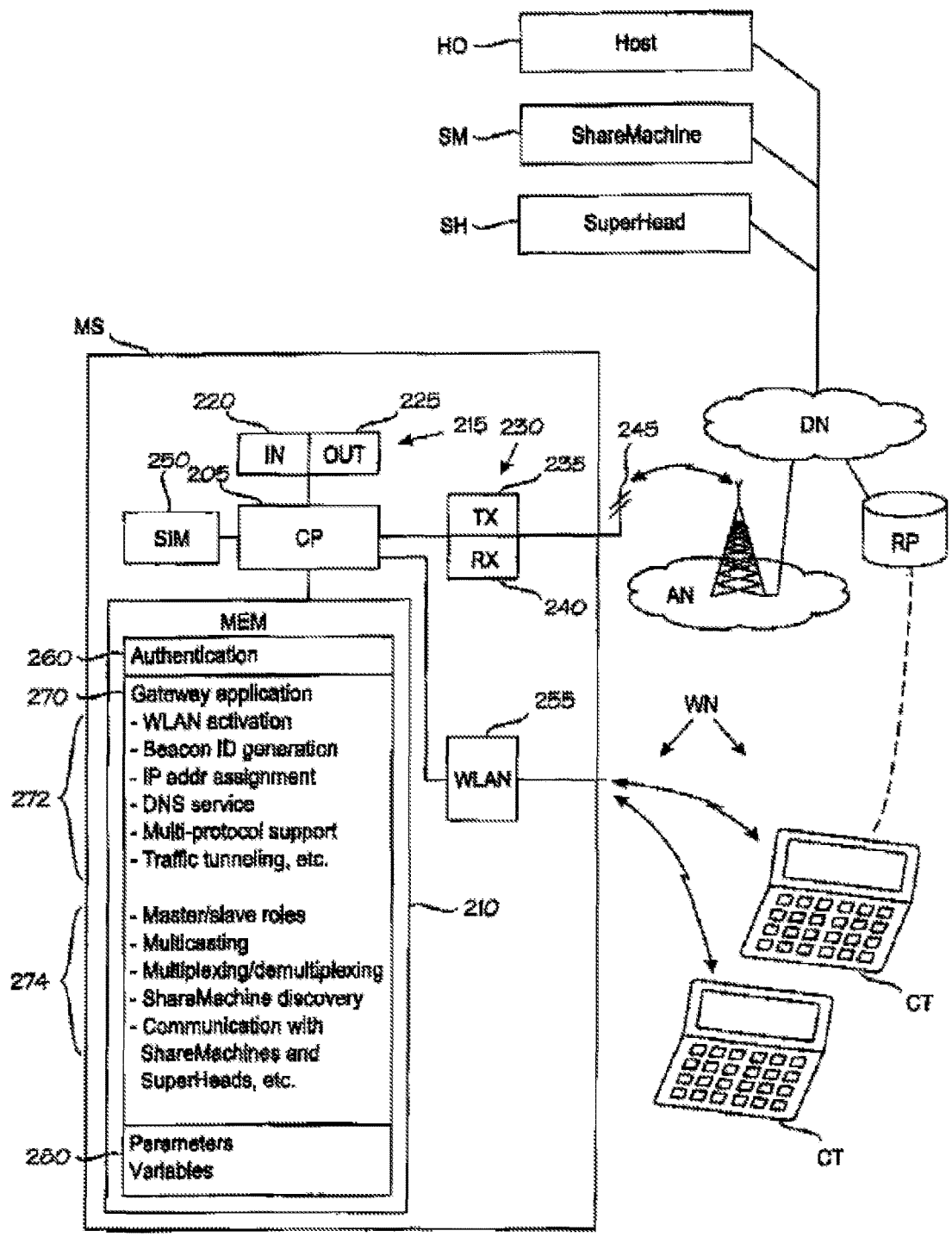
FIG. 2 shows a mobile station configured for use in a scalable WLAN gateway.

FIG. 2 shows a mobile station configured for use in a scalable WLAN gateway. The description of the mobile station begins by describing how a mobile station can act as a unitary (non-scalable) gateway. Such a gateway operation is described in reference documents 1 and 2 (commonly owned, unpublished applications).

For acting as a unitary (non-scalable) gateway, the mobile station MS comprises a central processing unit CP 205 and memory 210. In addition, the mobile station MS comprises or utilizes external input-output circuitry 215 which constitutes the mobile station's user interface and comprises an input circuitry 220 and an output circuitry 225. The input circuitry 220 comprises the mobile station's microphone and user-input device, such as a keypad and/or touch screen. The output circuitry 225 comprises the mobile station's display and earphone or loudspeaker. The mobile station MS further comprises reception/transmission circuitry 230 which comprises a transmission circuitry 235, reception circuitry 240 and antenna 245. A subscriber identity module, SIM, 250 is used by an authentication function 260 to authenticate the mobile station user and to identify the user's subscription to the access network. The mobile station also comprises WLAN (Wireless Local Area Network) circuitry 255 whose normal mode of usage is acting as a WLAN client to a WLAN base station (not shown).

In order to support installable program modules, the mobile station's memory MEM 210 may comprise routines for downloading installable program modules and for storing the installable program modules in the memory MEM for execution by the central processing unit CP. FIG. 1 shows an arrangement in which the mobile station is configured to download installable program modules from a repository RP via a data network DN, an access network AN, the antenna 245 and reception circuitry 240, although other arrangements are equally possible, such as downloading the installable program modules via the data network DN to a client terminal CT, from which the installable program modules are transferred to the mobile station the WLAN circuitry 255 or via some other short-range connection, such as Bluetooth or Universal Serial Bus (USB, not shown separately). The access network AN is typically a broadband capable mobile communication network, while the data network DN is typically the internet or some closed subnetwork implementing internet protocol (IP), commonly called intranets or extranets. At this level of generalization, all previously-discussed elements of FIG. 1 can be conventional as used in the relevant art. One or more external hosts are accessible via the access network AN and data network DN, as will be described in more detail below. Finally, reference numeral 280 denotes an area of the memory 210 used to store parameters and variables.

The foregoing description of FIG. 1 describes an applicable mobile station in technical terms. Such mobile stations are commercially available: For instance, at the priority date of the present invention, mobile stations based on Symbian S60 or S80 platforms can be used, provided that they support WLAN and broadband communications. A departure from prior art mobile stations can be seen in the fact that the mobile station comprises the inventive gateway application 270, either as a factory-installed software application or as a downloadable application. The client terminals CT resemble laptop computers or smart telephones, but those skilled in the art will realize that the mobile station MS provided with the inventive gateway application 270 supports virtually any client terminal capable of acting as a WLAN client, personal digital assistants, home entertainment devices, digital cameras, etc., to name just a representative sample of applicable device types.

Within the gateway application 270, reference numeral 272 collectively denotes program-implemented functions which are used to operate the mobile station as a non-scalable gateway which provides one radio interface to one or several client terminals. These functions, which will be described in connection with FIG. 5, include establishment of an ad-hoc WLAN network, generation of a beacon ID, IP address assignment and discovery (eg DHCP), domain name services (DNS) in cooperation with external domain name servers, multi-protocol support and roaming support. The multi-protocol support functionality may include a Network Address & Port Translation (NAPT) block which translates the source and destination addresses. Translation of port numbers may be used to identify various connections to or from the same IP address. A detailed conversion example will be described in connection with FIG. 8.

Reference numeral 274 collectively denotes program-implemented functions which are used to operate the mobile station as a scalable gateway which coordinates provision of multiple radio interfaces to one or several client terminals. These functions, which will be described in connection with FIGS. 6 through 8, include a multicasting function, which includes packet multicast transmission and signaling in the WLAN network, packet delivery and signaling between a master mobile station and a slave mobile station, and a communication function for communicating with SuperHead and ShareMachine computers.

Figure 3:
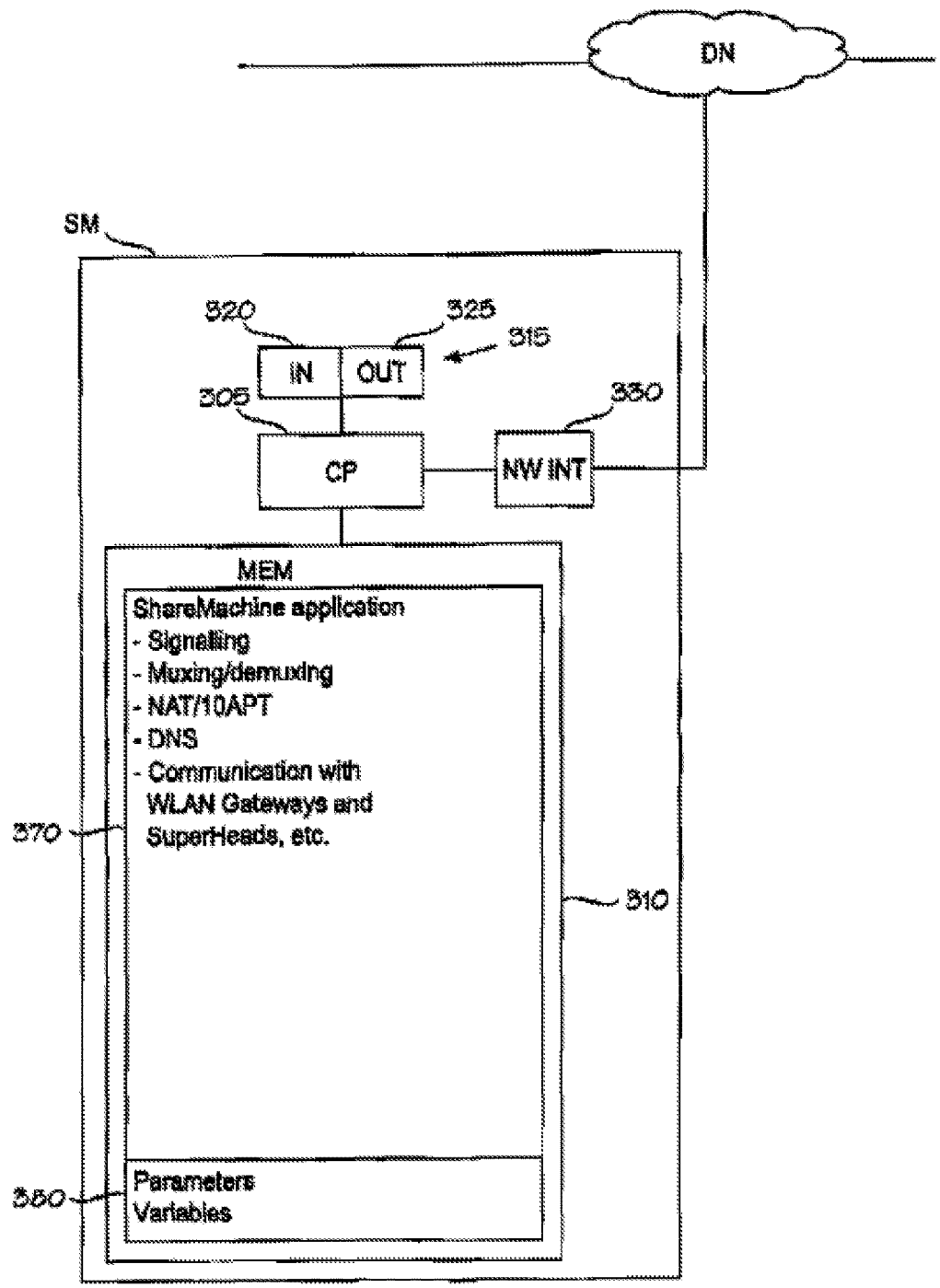
FIG. 3 shows a block diagram of a ShareMachine computer.

FIG. 3 shows a block diagram of a multiplexing/demultiplexing computer which, in the context of the present invention, is called a ShareMachine computer SM. It comprises a central processing unit CP 305 and memory 310, as well as a network interface 330 for communicating with data networks DN, such as the internet. The ShareMachine computer SM also comprises or utilizes external input-output circuitry 315 which constitutes the ShareMachine computer's user interface and comprises an input circuitry 320 and an output circuitry 325.

The nature of the user interface depends on which kind of computer is used to implement the ShareMachine computer SM. If the ShareMachine computer is a dedicated computer, it may not need a local user interface, such as a keyboard and display, and the user interface may be a remote interface, wherein the ShareMachine computer is managed remotely, such as from a web browser over the internet, for example. On the other hand, it is expected that some access network operators may display a hostile attitude to the present invention in general and the ShareMachine computers in particular, because the present invention makes it possible to share one or a few access network subscriptions among a larger number of client terminals. Thus some network operators may attempt to block the operation of the ShareMachine computers. In order to improve the robustness of the invention, a relatively large number of potential ShareMachine computers may be involved. Conventional home computers are prime examples of potential ShareMachine computers. In that case, the user interface should be a local interface, including a display, keyboard and pointing device, although for the purposes of the present invention, the user interface is primarily needed to launch the software application 370 which makes an appropriate computer (hardware-wise) into the inventive ShareMachine computer. In addition, the user interface may be utilized for obtaining traffic statistics.

Reference numeral 380 denotes an area of the memory 310 used to store parameters and variables.

The ShareMachine computer's software application 370 comprises program code for instructing the processor to execute the following functions. A signaling function permits the ShareMachine computer to discover participating elements, such as gateway mobile stations. A SuperHead communication function enables communication with a SuperHead computer (in XML over HTTPS, for example). An optional configuration/reporting function enables configuration of the ShareMachine computer and traffic statistics reporting via a user interface, which may be a local user interface or a remote user interface. A packet management function performs packet packing/unpacking and multiplexing/demultiplexing as well as NAT/NAPT (Network Address (and Port) Translation) operations. A DNS function permits the ShareMachine computer to participate in DNS operations with pre-existing internet-based DNS servers.

Figure 4:
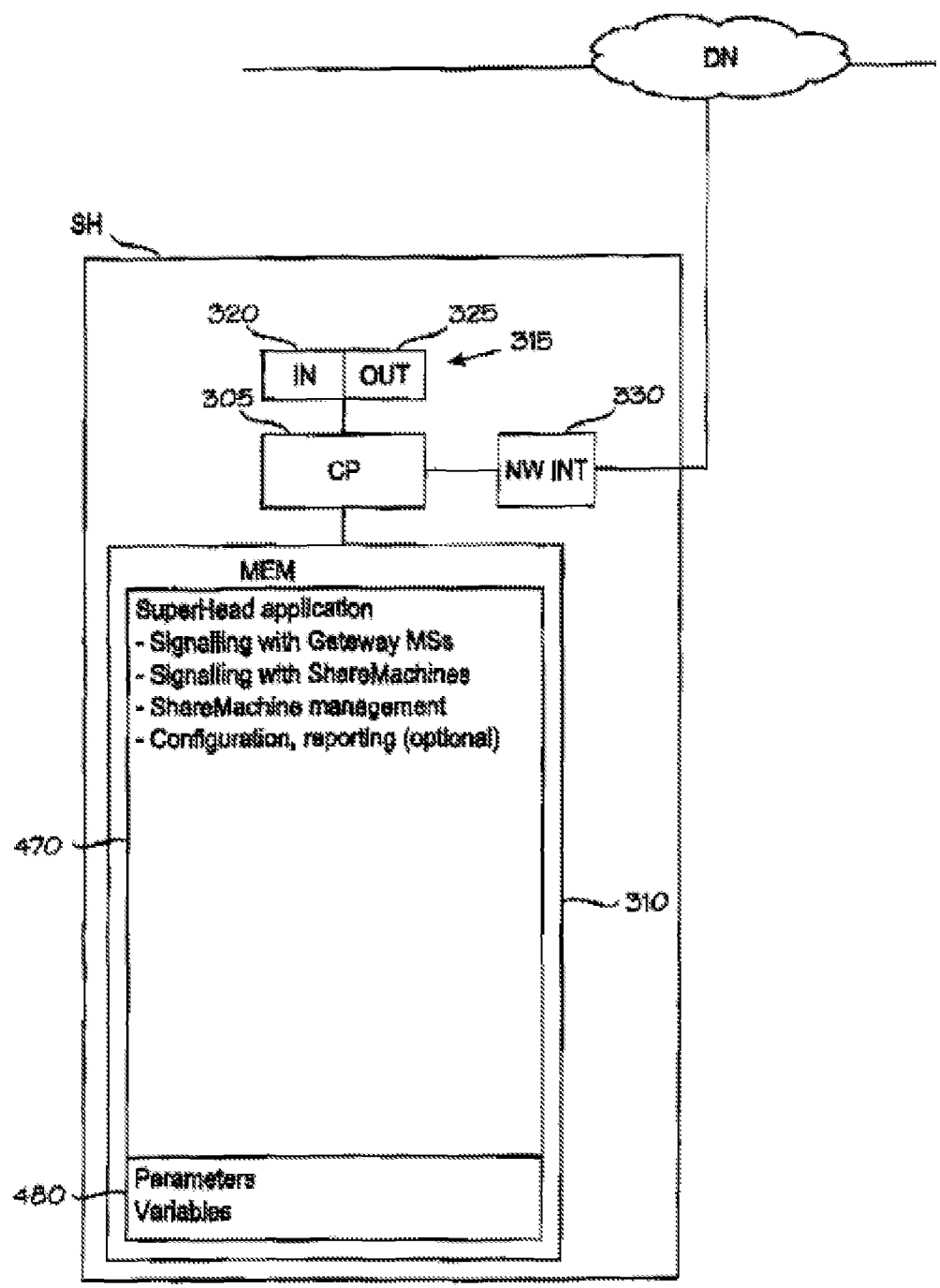
FIG. 4 shows a block diagram of a SuperHead computer.

FIG. 4 shows a block diagram of a service coordination server, colloquially called a SuperHead computer and denoted by reference sign SH. The purpose of the SuperHead computers is to coordinate the services of the ShareMachine computers SM. As regards a functional description of the hardware blocks, which are denoted by reference numerals 305 through 330, the SuperHead computer SH can be similar to the ShareMachine computer SM shown in FIG. 3, and the description of the hardware elements will not be repeated. It is the SuperHead software application 370 that makes the SuperHead computer SH perform the following inventive functions.

A ShareMachine communication function enables communication with ShareMachine computers (in XML over HTTPS, for example). A ShareMachine management function enables keeping track of ShareMachine computers and prioritization of them according to various operating parameters and IP addresses, which are to be communicated to Gateway Mobile Stations. An optional configuration/reporting function enables configuration of the SuperHead computer and traffic statistics reporting via a user interface, which may be a local user interface or a remote user interface.

Figure 5:
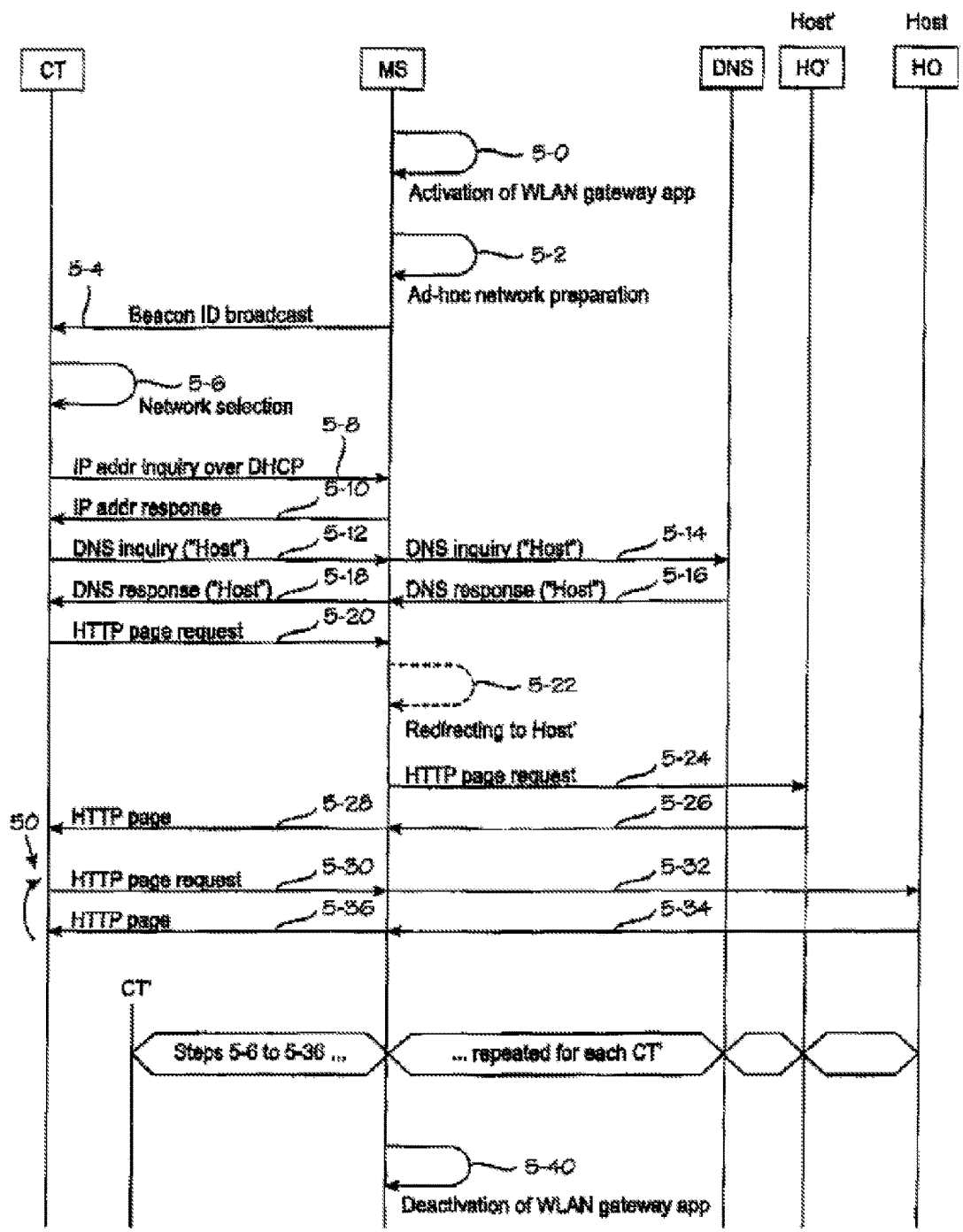
FIG. 5 is a signaling diagram illustrating a gateway establishment in a scenario which comprises a WLAN client terminal, a mobile station configured as a gateway, a DNS server and an internet host.

FIG. 5 is a signaling diagram illustrating a gateway establishment in a scenario which comprises a WLAN client terminal, a mobile station configured as a gateway, a DNS server and an internet host. FIG. 5 depicts an illustrative scenario involving a client terminal CT and a mobile station which supports a gateway application according to the present invention. In step 5-0 the inventive gateway application is executed in the mobile station. The execution of the gateway application is typically started in response to a user instruction via the mobile station's user interface. In a typical implementation, the mobile station receives user interface navigation instructions to "Applications" from which the inventive gateway application is selected for execution. One of the acts performed by the mobile station's processor, under control of the inventive gateway application, is to ensure that the WLAN circuitry of the mobile station is operational. The significance of step 5-0, and of the corresponding deactivation step 5-40, is that the mobile station is only reserved for wireless broadband gateway applications for a user-specified time, and at other times the mobile station can perform whatever tasks required by its user.

In step 5-2 the gateway application instructs the mobile station's processor to prepare an ad-hoc WLAN network around the mobile station, by acting as a WLAN base station (as opposed to the mobile station's more conventional usage as a WLAN client). In step 5-4 the gateway application instructs the mobile station to initiate broadcasting of a beacon ID message, which typically is an IBSSID message as defined in standard IEEE 802.11x. Step 5-4 is depicted as an arrow, but in practice the broadcasting of the beacon ID message should be repeated until step 5-40 in which the execution of the gateway application is terminated.

In step 5-6 the client terminal CT searches for available WLAN networks and detects the broadcasted beacon ID and selects the WLAN network created by the mobile station MS. In step 5-8 the client terminal CT, as part of a conventional WLAN attach procedure, requests an IP address from the mobile station's WLAN base station, which returns the requested IP address in step 5-10. Dynamic Host Configuration Protocol (DHCP) is typically used for steps 5-8 and 5-10.

Let us assume that the client terminal CT tries to retrieve a web page from the internet host (item 190 in FIG. 1). In step 5-12 the client terminal CT sends a domain name service (DNS) query for the IP address of the host's web page to the DNS server of the mobile station's gateway application. In step 5-14 the mobile station's gateway application forwards the DNS query to internet's domain name service and obtains the host's IP address in step 5-16. In step 5-18 the mobile station's gateway application returns the host's IP address to the client terminal CT.

In step 5-20 the client terminal CT requests a web page from the host's IP address. Hypertext Transfer Protocol (HTTP) is typically used for this purpose. This request, like any communication between the client terminal CT and any internet hosts, takes place via the inventive gateway application being executed in the mobile station.

Step 5-22 is an optional step which may be omitted in some embodiments. When performed, step 5-22 comprises redirecting the first HTTP page request from client terminal CT to another internet host, called Host'. This means that in step 5-24 the gateway application forces the client terminal's first HTTP page request to a forced home page at the IP address of Host'. For example, the operator of the site Host' may display advertisements in exchange of sponsoring communication costs over the access network AN. In step 5-26 the web site Host' returns the requested web page, which the gateway application relays to the client terminal CT in step 5-28.

In step 5-30 the client terminal CT again requests the web page from the host's IP address. Since this the second (or further) page request from the client terminal, the gateway application no longer redirects the HTTP request but relays it to the Host in step 5-32. In steps 5-34 and 5-36 the requested web page from the Host is transmitted to the client terminal. As shown by arrow 50, the process can return from step 5-36 to step 5-20 when future web pages are requested. The loops 5-30 through 5-36 can be repeated until the gateway application is terminated in step 5-40. If the forced home page feature (step 5-22) is not implemented, the first HTTP request (step 5-20) is processed similarly to the subsequent HTTP requests (step 5-30). In subsequent executions of step 5-30, if the HTTP page request relates to a web page for which the gateway application does not have an IP address, a DSN query will be performed (cf. steps 5-14 and 5-16).

FIG. 5 also shows an additional client terminal, denoted CT'. Steps 5-6 through 5-36 will be repeated for each additional client terminal. This means that by virtue of the inventive gateway application, which instructs the mobile station MS to act as a WLAN base station (as opposed to a WLAN client), the mobile station MS can support an arbitrary number of client terminals which act as WLAN client terminals and which, by virtue of the authentication performed by the mobile station, can share a single subscription to the access network.

FIG. 5 and the foregoing description of it illustrate use of HTTP protocol. The inventive gateway application supports other protocols in an analogous manner and assigns a specific port number to each supported protocol. For instance, the gateway application can instruct the mobile station to convey encrypted HTTPS traffic by utilizing the Proxy Configuration field of HTTPS protocol.

Figure 6:
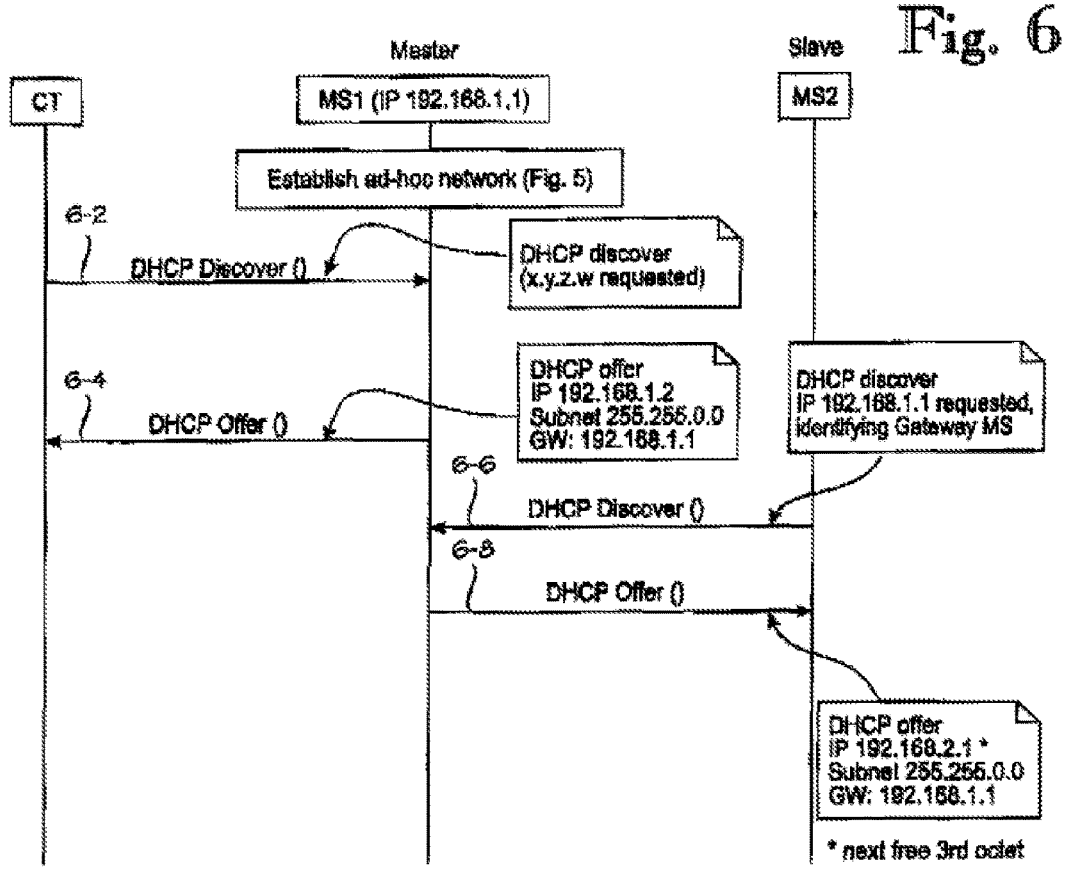
FIG. 6 is a signaling diagram illustrating IP address discovery and DHCP operation, which involves a WLAN client terminal, a master gateway and a slave gateway.

FIG. 6 is a signaling diagram illustrating IP address discovery and DHCP operation, which involves a WLAN client terminal CT, a master mobile station MS1 and a slave mobile station MS2. Both mobile stations MS1 and MS2 execute the inventive gateway application 270 (see FIG. 2), including the functions 272 and 274. In a typical implementation, the mobile stations MS1 and MS2 and their gateway applications are identical. The mobile station that first establishes the ad-hoc WLAN network, as described in connection with FIGS. 1 and 5, becomes the master mobile station MS1, and any subsequent mobile stations that join the ad-hoc WLAN network afterwards will assume the role of a slave mobile station. For the interest of clarity, FIGS. 6 through 8 only show one slave mobile station MS2, but the invention and its embodiments are scalable to any reasonable number of mobile stations. For the interest of brevity, the words "mobile station" may be omitted and the master and slave mobile stations may be referred to as "master" and "slave".

In step 6-2 the client terminal CT requests an IP address from the master MS1 in an DCHP Discover( ) procedure. In step 6-4 the master MS1 sends the client terminal CT the requested IP address. In the present example, the master MS1, whose own IP address of is 192.168.1.1, offers the client terminal the next available IP address, which is 192.168.1.2. In step 6-6 the mobile station MS2, having detected that an ad-hoc WLAN network already exists, requests an IP address from the master MS1. In the example shown, the master MS1 grants in step 6-8 the slave MS2 an IP address of 192.168.2.1, which in this example is derived from the masters' own IP address by setting the third octet to the next available number. In other words, the slave mobile station MS2 is assigned a subnet of its own. This implementation provides certain benefits as regards optimization of resource utilization. For instance, the slave mobile station MS2 may act as a WLAN gateway to some of the client terminals, whereby it is not necessary to route all traffic via the master mobile station MS1.

It should be noted that in a typical environment the IP address lease time cannot be very long because the ad-hoc network does not indicate when a slave mobile station leaves the network. After a mobile station leaves the network, the gateway and subnet addresses should be renewed quickly. In a typical environment, in which the mobile stations are not dedicated to gateway service, the IP lease time is preferably no more than a few minutes.

Figure 7:
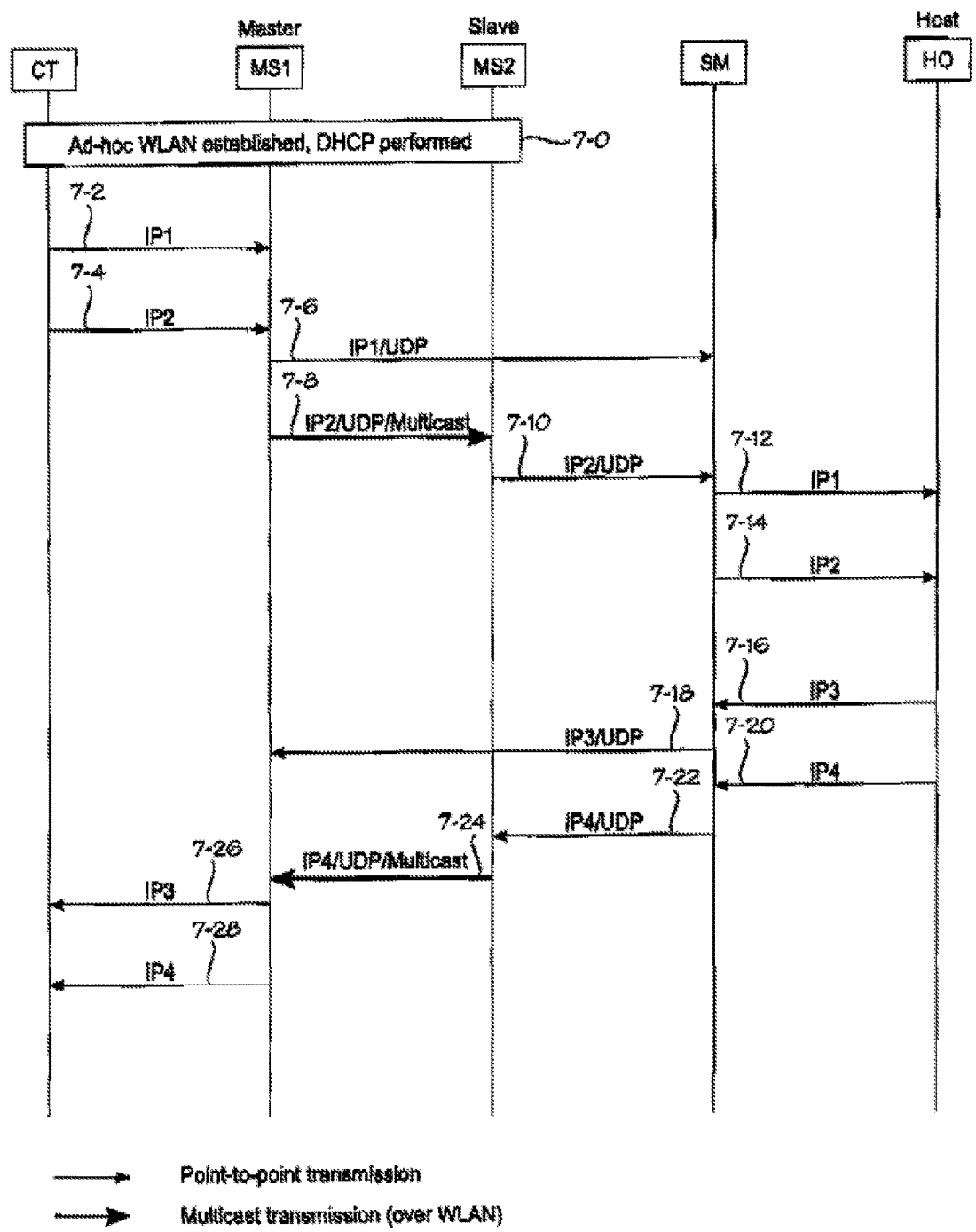
FIG. 7 is a signaling diagram illustrating a flow of data packets from a WLAN client terminal to an internet host via a master gateway, a slave gateway and a ShareMachine computer.

FIG. 7 is a signaling diagram illustrating a flow of data packets from a WLAN client terminal CT to an internet host via a master mobile station/gateway MS1, a slave mobile station/gateway MS2 and a ShareMachine computer SM. In the initial state 7-0, an ad-hoc WLAN network (item WN in FIG. 1) has been established and a DHCP discovery procedure has been performed, as described in connection with the preceding FIGS. 5 and 6. In the embodiment described herein, the ad-hoc WLAN network comprises a master gateway mobile station MS1 and a slave gateway mobile station MS2, but the client terminal CT only communicates with the master MS1.

In steps 7-2 and 7-4 the client terminal CT sends two IP packets IP1 and IP2 to the master MS1. The ultimate destination of the IP packets is the internet Host HO. The master MS1 thus acts as the client terminal's only access point to the internet. In step 7-6 the master MS1 sends the first IP packet IP1 as an UDP packet to the ShareMachine computer SM. Any intervening access networks are omitted for clarity, but they are shown in FIG. 1. In step 7-8 the master MS1 multicasts the second IP packet IP2 as an UDP packet, and the slave MS2 captures the multicast transmission. In step 7-10 the slave MS2 sends the second IP packet IP2 as an UDP packet to the ShareMachine computer SM. In steps 7-12 and 7-14 the ShareMachine computer SM sends the IP packets IP1 and IP2 to the Host. In the example described herein, UDP packets were used for efficiency's sake. If better robustness is desired and some efficiency can be sacrificed, TCP protocol may be used instead.

Figure 8:
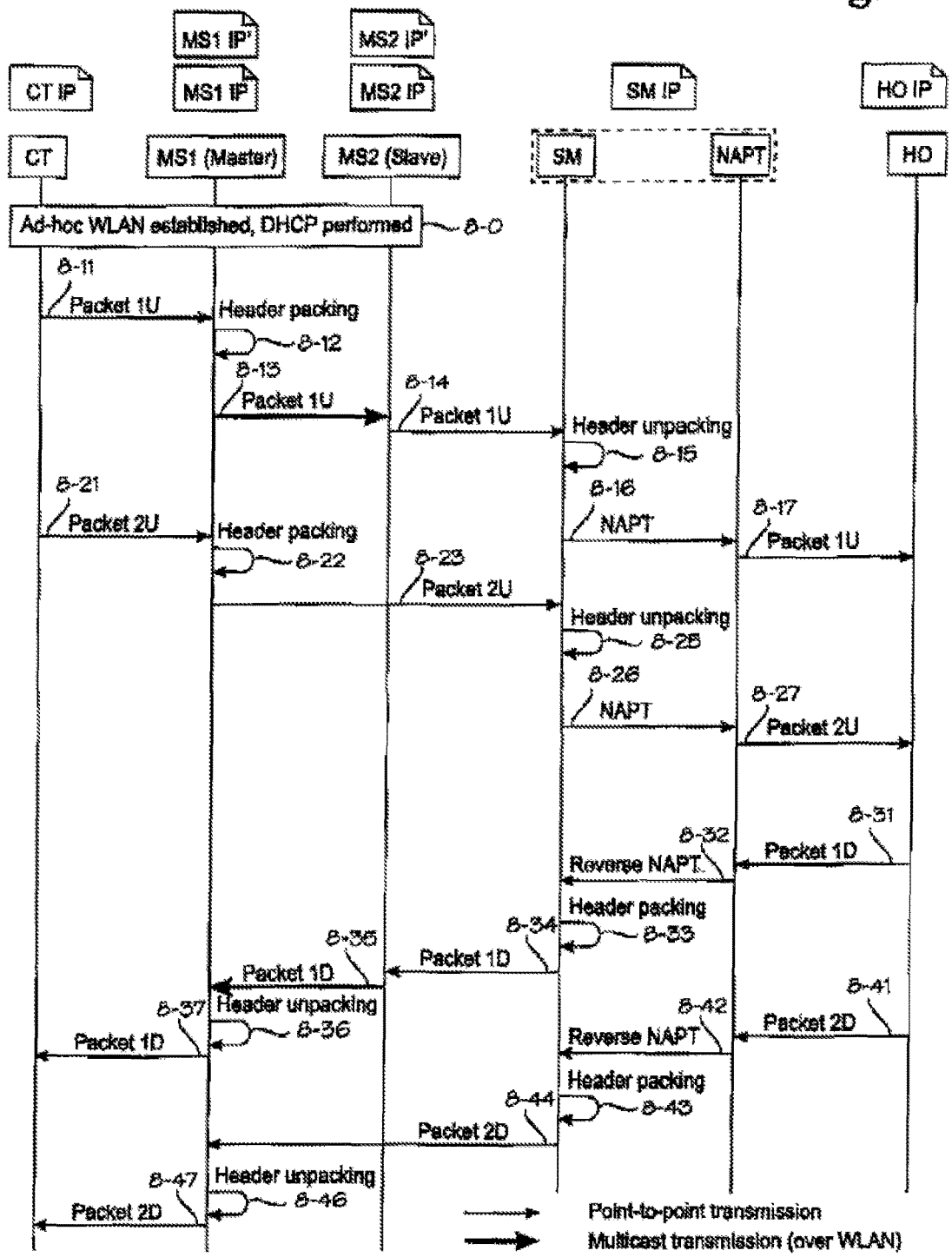
FIG. 8 is a more detailed signaling diagram illustrating data flow from a WLAN client terminal to an internet host via a master gateway, a slave gateway and a ShareMachine computer.

For the purposes of FIGS. 7 and 8, it suffices that the master gateway mobile station MS1 somehow knows or obtains the address of the ShareMachine computer SM. For instance, in a simple implementation the master MS1 or its user may utilize an internet search engine to discover addresses of available ShareMachine computers. An enhanced procedure for obtaining the ShareMachine computer's address from a SuperHead computer will be described in connection with FIG. 9.

The reason for using multicast over point-to-point transmission is that Symbian® S60 or S80 platforms, which a large portion of current WLAN equipped mobile stations are based on, do not provide an Application Programming Interface (API) function to access the Media Access Control (MAC), or device hardware, layer by individual packets. Resorting to the multicast transmission in the WLAN network provides a workaround solution for this problem.

In one specific implementation the overhead due to multitasking is reduced by setting a flag in the first (master) mobile station/gateway, such that the slave mobile stations/gateways do not have to unpack each packet to see its destination. The multitasking operation also compensates for the fact that packet loss is a definite handicap in mobile access networks. As a result of the multicast transmission via multiple alternative routes, the likelihood of at least one successful packet delivery is increased. In addition, the multitasking operation increases robustness of the ad-hoc WLAN network. If one of the slave mobile stations/gateways disappears from the WLAN network, the packets may still survive.

In the scenario shown in FIG. 7, the master MS1 sends the first IP packet IP1 to the ShareMachine computer SM directly, while the second IP packet IP2 is sent via the slave MS2. The next IP packet (not shown) will be sent directly again, and so on, in order to achieve load balancing among the gateways MS1, MS2 and the access networks AN1, AN2 (see FIG. 1). It is possible that, as a result of the overhead caused by sending some packets via the slave(s) and/or varying delays in the access networks, the ShareMachine computer SM receives some packets out of sequence, and packet IPn will be received after packet IPn+1. Thus the ShareMachine computer SM should be able to buffer packets coming out of sequence until it has received all the packets it needs to forward them to the Host in the correct sequence. The ShareMachine computer SM may employ a protocol watchdog timer that raises an alert if some packet is not received for a predetermined period of time, in which case the ShareMachine computer SM may request retransmission of the packets starting from the last properly received packet.

In steps 7-16 through 7-28, two internet packets IP3 and IP4 are sent from the Host, via the ShareMachine computer SM and the gateways MS1, MS2, to the client terminal CT. Based on the preceding the description of the reverse direction, the packet transmission from the Host to the client terminal CT is mostly self-explanatory and a detailed description is omitted. In this case the slave MS2 must send the packet IP4 over multicast transmission to the master MS1, and it is the task of the master MS1 to assemble the packets in the correct sequence, by requesting retransmission if necessary.

The embodiment described herein provides the benefit that the operation of the inventive scalable gateway is completely transparent to the client terminal CT and the Host, which need no modifications whatsoever and which can only detect an increased transmission speed.

FIG. 8 is a more detailed signaling diagram illustrating data flow from a WLAN client terminal CT to an internet host HO via a master gateway mobile station MS1, a slave gateway mobile station MS2 and a ShareMachine computer SM. In the present embodiment, the ShareMachine computer comprises a Network Address Translation block, which is also capable of Port Translation, as well as the corresponding reverse translations. In the present context, this block is called a Network Address & Port Translation block NAPT. Because the NAPT block changes the IP addresses, it is shown as a distinct network element, although in practice it may be, and typically is, an integral functional block of the ShareMachine computer SM. The NAPT block may utilize the packets' port numbers to identify the source and destination addresses and to separate the packets based on the addresses.

As shown near the top of FIG. 8, the primary IP address assigned to the network elements CT, MS1, MS2, SM and HO are denoted by a suffix "IP" after the reference sign of the respective network element. For example, CT IP is the IP address assigned to the client terminal CT. The master and slave gateway mobile stations MS1 and MS2 also employ a secondary IP address each, and these are denoted with a prime after the "IP" suffix. For example, MS1 IP' is the secondary IP address assigned to the master gateway mobile station MS1. The secondary IP addresses of the mobile stations are used for the communication between the mobile stations MS1, MS2 and the ShareMachine computer SM. In one representative implementation, the mobile stations' primary IP addresses MS1 IP and MS2 IP are assigned from the subnetwork of the master mobile station MS1, while the secondary IP addresses MS1 IP' and MS2 IP' are public IP addresses assigned by the mobile stations' respective access network operators.

In the initial state 8-0, an ad-hoc WLAN network has been established and a DHCP procedure has been performed. The remaining steps of FIG. 8 constitute four major phases, which are transmitting a first packet 1U and a second packet 2U from the client terminal CT to the host HO (called uplink transmission) and transmitting a first packet 1D and a second packet 2D from the host HO to the client terminal CT. Addressing details of the messages and operations shown in FIG. 8 are compiled into table 1.

Steps 8-11 through 8-17 relate to the transmission of the first uplink packet 1U from the client terminal CT to the host HO. In step 8-11 the client terminal CT sends the packet 1U to the master mobile station MS1. As shown in Table 1, the packet 1U is an Ethernet packet over the WLAN network established by the master mobile station MS1. The source and destination addresses of the packet 1U are the MAC addresses of the master mobile station MS1. The packet's payload contains IP Data, as transmitted by the client terminal. Table 1 also contains a second row entry for the step 8-11, and this means that there is an IP packet encapsulated within the Ethernet packet. The IP packet's source and destination addresses are the IP addresses of the client terminal CT and host HO, respectively. Step 8-12 is an optional header packing step, the purpose of which is to optimize the use of the radio interface bandwidth. In the scenario shown in FIG. 8, the master mobile station MS1 does not send the first packet 1U directly to the ShareMachine computer SM but via the slave mobile station MS2. Accordingly, step 8-13 comprises sending the packet 1U as a multicast transmission, which involves sending from the MAC address of MS1 an Ethernet packet into which is encapsulated an UDP packet. The UDP packet, in turn, contains the actual IP packet, as shown in Table 1. The slave mobile station MS2, having received the multicast transmission, sends the UDP packet to the IP address of the ShareMachine computer SM in step 8-14. The header unpacking step 8-15 reverses the effect of the header packing step 8-12. In step 8-16 the NAPT block of the ShareMachine computer SM performs Network Address Translation on the packet 1U. After the Network Address Translation, in step 8-17, the ShareMachine computer SM sends the first uplink packet 1U to the host HO.

Steps 8-21 through 8-27 relate to the transmission of the second uplink packet 2U from the client terminal CT to the host HO. The transmission of the second uplink packet 2U is simpler than the transmission of the first uplink packet 1U in that the packet 2U is sent directly from the master mobile station MS1 to the ShareMachine computer SM, and the multicast transmission over the WLAN is omitted. The transmission of packets originating or terminating at the client terminal CT and host HO is similar regardless of whether or the packet is conveyed via the slave mobile station MS2. This means that the transmission is transparent to the client terminal CT and host HO, which can only detect an improved transmission bandwidth.

Steps 8-31 through 8-37 relate to the transmission of the first downlink packet 1D from the host HO to the client terminal CT. Finally, steps 8-41 through 8-47 relate to the transmission of the second downlink packet 2D from the host HO to the client terminal CT. A detailed description of the various transmissions is omitted as the downlink transmission is analogous with the uplink transmission, and the necessary addressing details are indicated in Table 1. In the embodiment described herein, the mobile stations' public (operator-assigned) IP addresses are used for communicating with the ShareMachine computer SM, while private IP addresses, i.e., those assigned by the master mobile station MS1, are used for communicating between the mobile stations.

TABLE 1

Addressing details relating to FIG. 8

| Step | Packet | Source | Destination | Data | Note |
|------|--------|--------|-------------|------|------|
| 8-11 | Ethernet Packet | CT MAC | MS1 MAC | IP Data | |
|      | IP Packet | CT IP | HO IP | IP Data | |
| 8-13 | Ethernet Packet | MS1 MAC | Multicast | UDP Packet | |
|      | UDP Packet | MS1 IP | Multicast | IP Packet | |
| 8-14 | UDP Packet | MS2 IP' | SM IP | IP Packet | |
| 8-16 | IP Packet | CT IP | HO IP | IP Data | Id by MS |

TABLE 1-continued

Addressing details relating to FIG. 8

| Step | Packet | Source | Destination | Data | Note |
|---|---|---|---|---|---|
| 8-17 | IP Packet | SM IP | HO IP | IP Data | public IP Unique Source port |
| 8-21 | | ---------- See 8-11 ---------- | | | |
| | IP Packet | CT IP | HO IP | IP Data | |
| 8-23 | UDP Packet | MS1 IP' | SM IP | IP Packet | |
| 8-26 | | ---------- See 8-16 ---------- | | | |
| 8-27 | | ---------- See 8-17 ---------- | | | |
| 8-31 | IP Packet | HO IP | SM IP | IP Data | Unique Dest'n port Id by MS public IP |
| 8-32 | IP Packet | HO IP | CT IP | IP Data | |
| 8-34 | UDP Packet | SM IP | MS2 IP' | IP Packet | |
| 8-35 | UDP Packet | MS2 IP | Multicast | IP Packet | |
| 8-37 | IP Packet | HO IP | CT IP | IP Data | |
| | Ethernet Packet | MS2 MAC | CT MAC | IP Data | |
| 8-41 | | ---------- See 8-31 ---------- | | | |
| 8-42 | | ---------- See 8-32 ---------- | | | |
| 8-44 | UDP Packet | SM IP | MS1 IP' | IP Packet | |
| 8-47 | | ---------- See 8-37 ---------- | | | |

In the above table, the expressions "unique source/destination port" means that the ShareMachine computer SM may identify various connections to the same host HO by means of port numbers. For instance, the ShareMachine computer SM may identify a connection from an exemplary client terminal CT to the host HO by port number 5555, while the next connection will be identified by port number 5556 (or any other unique value). When the host HO sends packets downstream, the ShareMachine computer SM can use the port number to determine which connection the downstream packets belong to.

Figure 9:
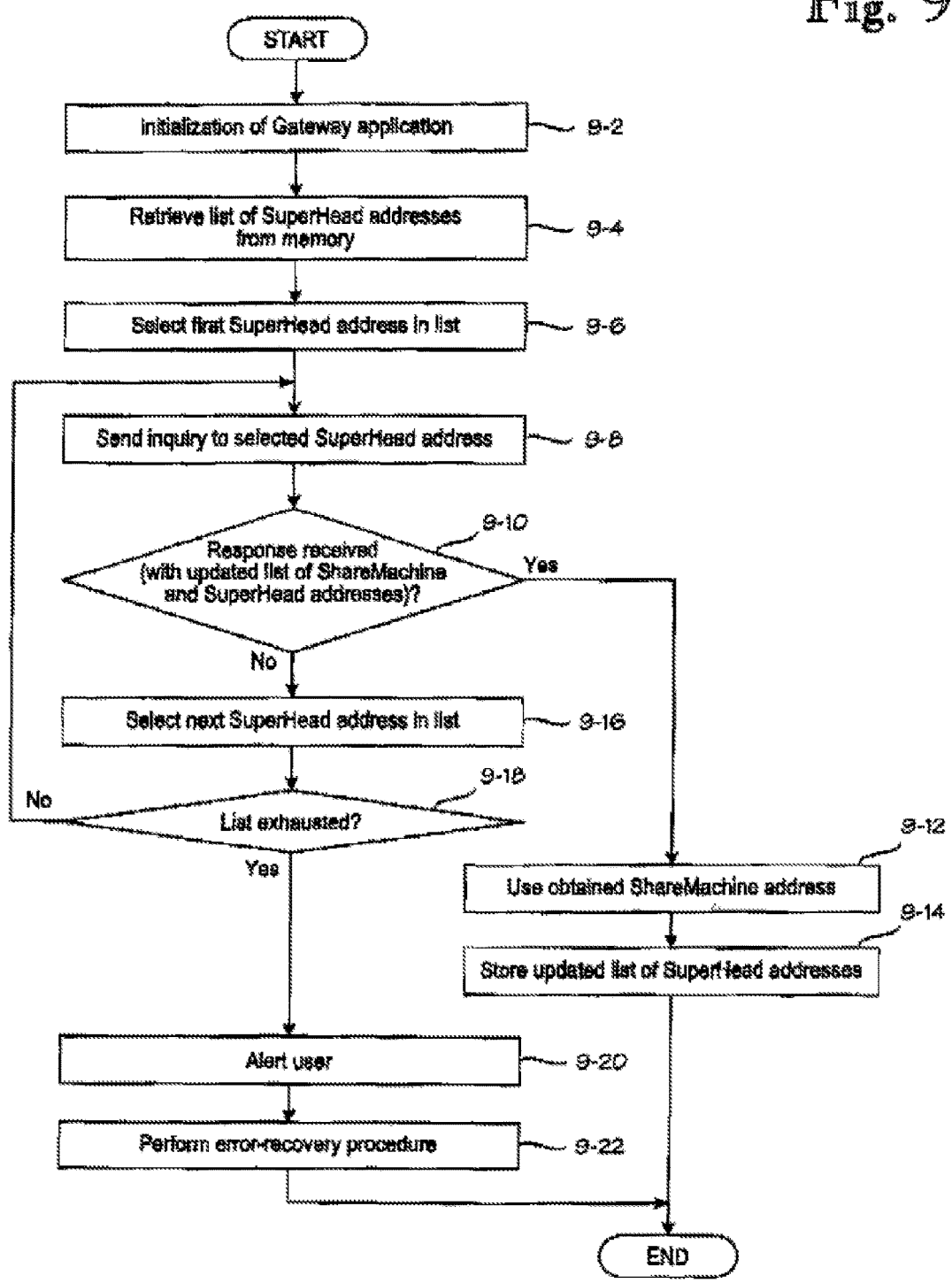
FIG. 9 discloses a procedure that the master mobile station may utilize to discover serving SuperHead and ShareMachine computers

FIG. 9 discloses a procedure that the master mobile station may utilize to discover a serving SuperHead and ShareMachine computers. Step 9-2 comprises initialization of the gateway application in the master gateway mobile station MS1, as described in connection with FIGS. 1, 2, 5 and 6. In step 9-4 the master MS1 retrieves a list of SuperHead computers from its memory. The installation of the gateway application into the master MS1 may store a default SuperHead list, and this list will be updated on subsequent executions of the gateway application. In step 9-6 the master MS1 selects the first SuperHead computer address from the list. In step 9-8 the master MS1 sends an inquiry to the selected SuperHead computer address. Step 9-10 involves a test as to whether a response to the inquiry was received from the selected SuperHead computer address. If the test is successful, the process proceeds to step 9-12, in which the master MS1 begins to use one or more of the obtained ShareMachine addresses. In step 9-14 the master MS1 stores the list of SuperHead addresses.

On the other hand, if the test in step 9-10 fails, the process proceeds to steps 9-16 and 9-18, in which the next SuperHead address from the list is tried. If the list of SuperHead addresses is exhausted, the process proceeds to step 9-20 and 9-22, which involve various user alerting steps and/or error recovery procedures. For instance, the master mobile station MS1 or its user may employ an internet search engine to obtain more SuperHead addresses.

A proper response from the SuperHead computer to the master MS1 should include a list of IP addresses of one or more available ShareMachine computers and, preferably, an updated list of available SuperHead computers. In a representative but non-restrictive implementation, such lists are sent in XML (eXtendible Markup Language) format. Reception of the list of available ShareMachine computers permits the master MS1 to know computers have reported themselves to the SuperHead computer as potential ShareMachine computers.

Typically each connection is served by one ShareMachine computer, but one master MS1 may serve several connections from one or more client terminals, and each connection may be served by a different ShareMachine computer. Also, it is beneficial if the master MS1 obtains and stores a list of several ShareMachine addresses, in case the active ShareMachine computer detaches itself from service or otherwise ceases to serve the connection.

In some embodiments the SuperHead and ShareMachine computers are implemented in a distributed manner. Such distributed implementation proves certain advantages, in addition to capacity considerations. For instance, many internet services or servers are threatened by network vandalism or sabotage, such as denial-of-service attacks. Furthermore, while there is nothing illegal in the usage of the access network subscription in the mobile stations, the inventive distribution of the access network subscriptions among several client terminals may result in access network traffic which is heavier than average, and the network operators may be tempted to prevent or obstruct the operation of the inventive gateway applications in the mobile stations. A distributed implementation of the SuperHead and ShareMachine computers makes them less vulnerable to such network-based vandalism by hackers or obstructions by access network operators. Robustness may be further improved by utilizing dynamic IP addresses for the SuperHead and/or ShareMachine computers.

In an enhanced implementation of the procedure shown in FIG. 9, the lists of SuperHead and ShareMachine computers are updated regularly, via inquiries to a SuperHead computer. Frequent updating of the SuperHead and ShareMachine addresses provide further robustness, particularly in cases where the SuperHead and/or ShareMachine computers are conventional home computers whose spare time is being utilized to serve connection in the manner described herein. When such home computers are turned off or used for other purposes, they stop operating as SuperHead and/or ShareMachine computers. Accordingly, the address updating frequency should be dimensioned based on representative operating patterns of typical home computers, with 10 minutes being a good starting value. While the SuperHead discovery procedure shown in FIG. 9 has been described in connection with a master mobile station MS1, the corresponding SuperHead discovery procedure may also be utilized by ShareMachine computers, with the variation that the ShareMachine computer registers itself with the discovered SuperHead computer as soon as it has discovered one.

In a variation of the address inquiry procedure described herein, the functions of the SuperHead and ShareMachine computers are combined in such a manner that the ShareMachine computers keep track of one another. In other words, the ShareMachine computers also act as SuperHead computers.

The previously described embodiments relate to provision of a scalable gateway functionality. One of the key elements of the invention is establishment of a WLAN access point in a mobile station. By establishing a WLAN access point in the mobile station, it will be possible to utilize some of the enhanced functionality of modern mobile stations.

In addition to merely conveying internet traffic between the client terminal CT and the internet host, the inventive gateway application can, in some specific embodiments, provide additional or supplementary services which utilize some of the functionality of modern mobile stations. In some implementations, such supplementary services are provided by an arrangement in which a supplementary server enhances the service(s) provided by a primary server. Such a supplementary server can be part of the functionality of the inventive WLAN gateway application, or it can be implemented as a network element distinct from the primary server.

One exemplary implementation of such additional services involves utilization of GPS (Global Positioning System) devices incorporated into some mobile stations. The inventive gateway application may be enhanced to associate GPS-provided geographical coordinates to the traffic originated by the client terminal, or to some of that traffic. For instance, the gateway application can tag still or video image data with geographical coordinates and/or use some additional service (not shown separately) that maps with geographical coordinates to a plaintext name of the relevant location. In another implementation the gateway application associates GPS-provided coordinates to the traffic, or some of it, while the actual tagging of the images with the coordinates is provided by some additional server, such as an image sharing server (not shown separately). Actually, what matters is the location of the client terminal and not the location of the mobile station acting as a WLAN gateway. But considering the short range of the mobile station's WLAN transmission, the mobile station's location can be used as the client terminal's location for virtually all practical purposes.

In a more ambitious implementation, the gateway application can provide additional services on the basis of the geographical coordinates. For instance, the gateway application can recognize various queries initiated by the client terminal and/or responses to those queries by internet servers and enhance the query responses by relevant map or photography information. For instance, the gateway application can detect a query to "post" and provide the query response with a map and/or photograph of the post office closest to the mobile station's GPS-provided geographical coordinates. In order to obtain the map and/or photograph, the gateway application may query a supplementary server which provides the requested functionality.

Another example of such additional services relates to traffic statistics which the gateway application collects and transmits to some internet-based supplementary server (not shown separately). For example, such a supplementary server may use the traffic statistics to monitor Quality of Service (QoS) parameters, which can be used to maintain the QoS at a specified level and/or to optimize resource usage in the access network. In some embodiments the supplementary server is an advertising server. The advertising server may utilize the traffic statistics for targeted or tailored advertising to the client terminal CT. Such traffic statistics may include, for example, user identification, usage (amount of traffic, usage times, internet addresses visited, query parameters, or the like). Alternatively or additionally, the gateway application can transmit traffic statistics to a billing server which participates in charging the client terminal's subscriber. Yet further, the advertising server and the billing server may cooperate in such a manner that the advertising server's operator sells advertisement space or time and the advertising server credits the client terminal's subscriber for any advertisements received. The credits are then relayed to and used by the billing server in order to reduce the client terminal's subscriber's invoice, generate additional services, extend pre-paid subscription time, to name just a few examples.

Finally, the gateway application may be configured to convey the mobile station's location, or some derivative it, to the advertising server for targeted or tailored advertising on the basis of the mobile station's location. For instance, targeted advertising for some goods or service may include sending an advertisement to a client terminal only if the mobile station's location indicates that the client terminal is reasonably close to the outlet of the goods or service. On the other hand, tailored advertising may be implemented such that the advertisement indicates the address or location of the closest outlet.

Figure 10:
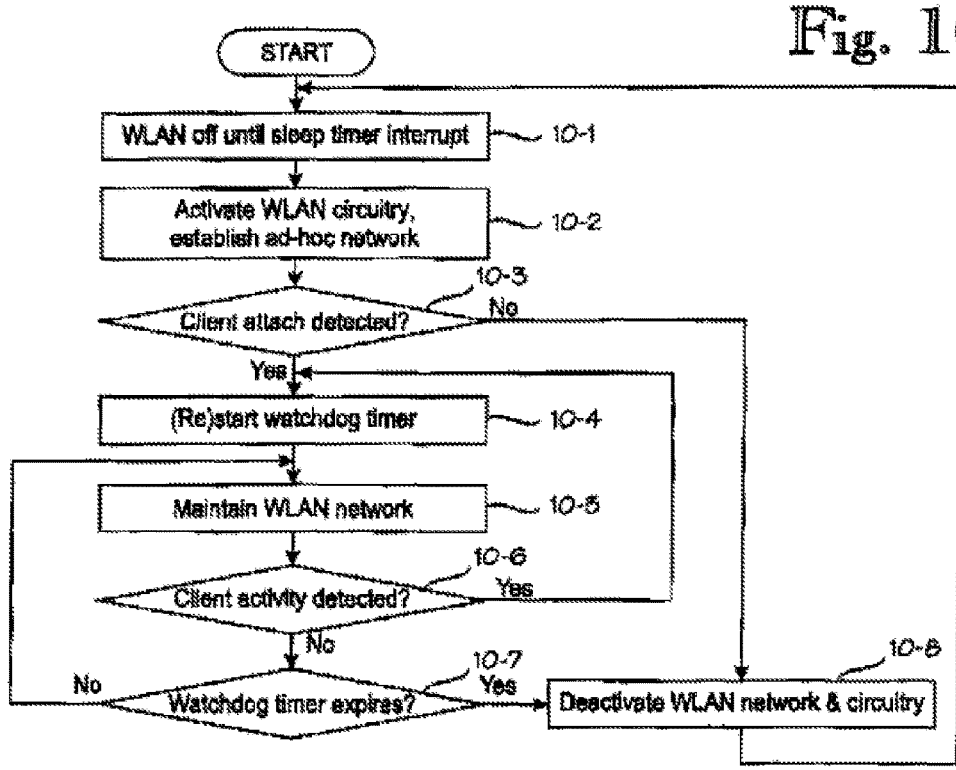
FIG. 10 shows an embodiment in which the gateway application in the mobile station is activated automatically in response to detection of a nearby WLAN client terminal.
Figure 11:
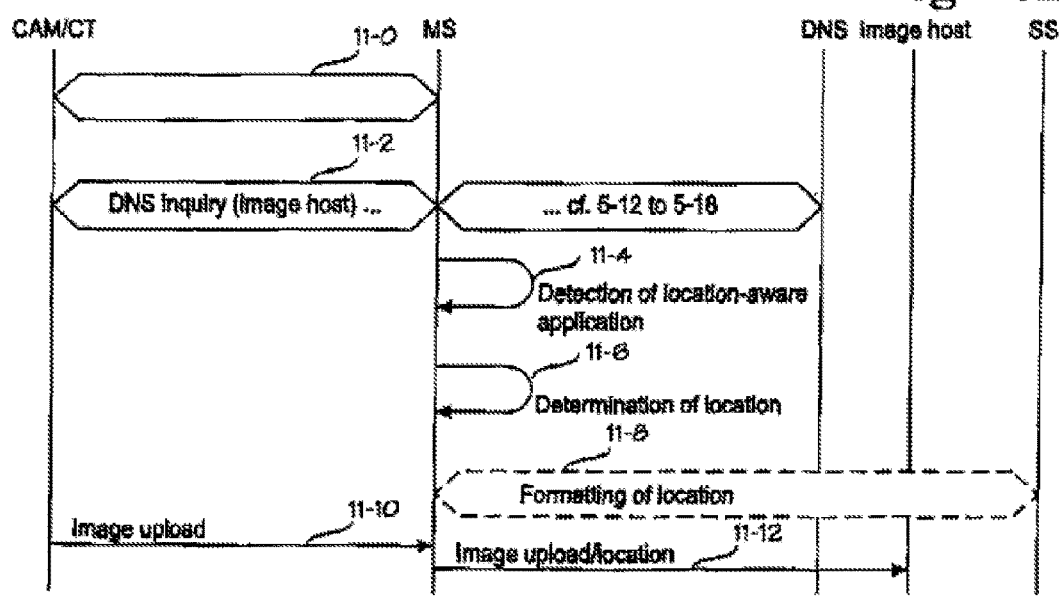
FIG. 11 shows an embodiment in which the mobile station's location-determination functionality is used to enhance image uploading to an image hosting server.

FIGS. 10 and 11 illustrate some exemplary embodiments in which the present invention benefits from the functionality of modern mobile stations, such that the resulting WLAN gateway is functionally superior to dedicated WLAN access points. FIG. 10 shows an embodiment in which the WLAN circuitry, and optionally the WLAN gateway application, in the mobile station MS is activated periodically to detect possible WLAN client terminals CT nearby. In one representative scenario, a WLAN-capable digital camera acts as a WLAN client terminal. In the embodiment shown in FIG. 10, the mobile station MS employs two timers which may be realized by means of software-implemented tick counters, as is well known to those skilled in the art. One of the timers is called a sleep timer while the other is called a watchdog timer. The sleep timer's function is to periodically wake up the mobile station's WLAN circuitry, and optionally the WLAN gateway application. The watchdog timer is used to detect non-activity periods of predetermined length in the WLAN network so that the WLAN circuitry can be powered off in order to optimize battery resources.

In step 10-1 the WLAN circuitry of the mobile station MS is powered off and the execution of the WLAN gateway application may be suspended or terminated. Step 10-1 terminates when the sleep timer expires. For instance, the sleep timer may generate a processor interrupt which directs the mobile station's processor to perform program routines for activating the WLAN circuitry and starting or resuming execution of the WLAN gateway application. After step 10-2 the mobile station has established a WLAN network. In step 10-3 the mobile station checks if any client terminal(s), such as the exemplary digital camera, attempt(s) to attach to the WLAN network. If not, the process proceeds to step 10-8, in which the WLAN network and circuitry are deactivated and the process begins anew at step 10-1. On the other hand, if any client terminal attaches to the WLAN network, the mobile station starts a watchdog timer in step 10-4 and maintains the WLAN network as indicated in step 10-5. Step 10-6 includes a test to detect client terminal activity. If client terminal activity is detected, the process returns to step 10-4 in which the watchdog timer is restarted. Naturally, any client-related requests are served as well, as part of the basic functionality of the WLAN gateway application. On the other hand, if no client terminal activity is detected, the process proceeds to step 10-7 which is a test as to whether the watchdog timer has expired. If not, the process returns to step 10-5 in which the WLAN network is maintained without restarting the watchdog timer. Eventually, a moment occurs when no client activity has been detected and the watchdog timer expires, and this is detected in step 10-7. Then, in step 10-8, the WLAN network and circuitry are deactivated and the process begins anew at step 10-1.

By virtue of the embodiment described in connection with FIG. 10, the WLAN gateway application may terminate its own execution and power off the mobile station's WLAN circuitry. The automatic execution of the gateway application and the accompanying automatic activation of the mobile station's WLAN circuitry provides certain benefits. For instance, both digital cameras and mobile stations are handicapped by small user interfaces and relatively short battery life, particularly when their liquid-crystal displays (LCD) are illuminated. The automation described in connection with the present embodiment alleviates such handicaps.

FIG. 11 shows an embodiment in which the mobile station's location-determination functionality is used to enhance image uploading to an image hosting server. In step 11-0 a WLAN connection is established between the gateway application being executed in the mobile station MS and the WLAN-equipped digital camera CAM acting as a client terminal CT. For details of the WLAN connection establishment a reference is made to FIGS. 5 and 10. In step 11-2 the camera CAM/CT initiates a DNS inquiry to obtain the internet address of the image hosting server. In step 11-4 an embodiment of the gateway application being executed in the mobile station MS detects that the camera/client terminal CAM/CT executes a location-aware application. Accordingly, the gateway application uses the mobile station's location-determination functionality to determine the mobile station's location. For instance, the mobile station's location may be determined on the basis of the mobile station's built-in satellite-positioning device (GPS) or on the basis of cell ID determination in the access networks. In an optional step 11-8, the gateway application sends the mobile station's location to an embodiment of the supplementary server SS, which in this scenario receives the mobile station's location and returns a plaintext-formatted location description. For instance, the geographical coordinates or cell ID of Piccadilly Circus might be converted to a plaintext description of "Piccadilly Circus, London". In step 11-10, the camera/client terminal CAM/CT begins uploading of image data to the image hosting server. In step 11-12 the gateway application complements the image data with the mobile station's location. In one particular implementation, the location data is placed in a metadata field of the image(s).

It is readily apparent to a person skilled in the art that, as the technology advances, the inventive concept can be implemented in various ways. The invention and its embodiments are not limited to the examples described above but may vary within the scope of the claims.

REFERENCES

FI20080032, filed Jan. 16, 2008, and
PCT/FI2008/050617, filed Oct. 30, 2008.

Both references are commonly owned patent applications whose contents are incorporated herein by reference. Reference 2 is an unpublished application at the filing date of the present invention, which is why some sections of its contents are repeated here.

What is claimed is:

1. An communication device providing network access over a wireless local area network (WLAN) for a WLAN client terminal with a second mobile station, the communication device comprising a memory and a processor coupled to the memory, wherein:
the processor is configured to:
establish the WLAN;
activate the WLAN;
receive, from the WLAN client terminal via the WLAN, a first data packet including address information of an internet host;
forward the first data packet to the second mobile station via the WLAN by sending the first data packet in multicast transmission; and
instruct the second mobile station to send the first data packet to the internet host according to the address information.

2. The communication device according to claim 1, the processor further configured to:
establish a connection with a mobile network;
receive a second data packet including the address information of the internet host from the WLAN client terminal via the WLAN; and
send the second data packet to the internet host via the connection with the mobile network according to the address information.

3. The communication device according to claim 2, wherein the address information includes an Internet Protocol (IP) address of the internet host.

4. The communication device according to claim 1, wherein the first data packet is forwarded as a User Datagram Protocol (UDP) packet.

5. The communication device according to claim 1, wherein the processor is further configured to:
receive a request for an Internet Protocol (IP) address over the WLAN from the WLAN client terminal;
assign an IP address to the WLAN client terminal, wherein the IP address assigned to the WLAN client terminal is derived from the second mobile station's own IP address by setting the fourth octet to an available number;
receive another request for an IP address over the WLAN from the second mobile station; and
assign another IP address to the second mobile station, wherein the IP address assigned to the second mobile station is derived from the second mobile station's own IP address by setting the third octet to an available number.

6. The communication device according to claim 1, wherein the processor is further configured to:
receive a third data packet targeting the WLAN client terminal forwarded by the second mobile station via the WLAN;
receive a fourth data packet targeting the WLAN client terminal transmitted via the connection with a mobile network;
assemble the third data packet and the fourth data packet in a sequence; and
send the third data packet and the fourth data packet to the WLAN client terminal via the WLAN, wherein the third data packet and the fourth data packet are from the internet host.

7. A method executed by a communication device for providing network access over a wireless local area network (WLAN) to a WLAN client terminal, the method comprising:
establishing the WLAN;
receiving, from the WLAN client terminal via the WLAN, a first data packet including address information of an internet host;
forwarding the first data packet to a second mobile station via the WLAN by sending the first data packet in multicast transmission; and
instructing the second mobile station to send the first data packet to the internet host according to the address information.

8. The method according to claim 7, further comprising:
establishing a connection with a mobile network;

receiving a second data packet including the address information of the internet host from the WLAN client terminal via the WLAN; and sending the second data packet to the internet host via the connection with the mobile network according to the address information.

9. The method according to claim 8, wherein the address information includes an Internet Protocol (IP) address of the internet host.

10. The method according to claim 7, wherein the first data packet is forwarded as a User Datagram Protocol (UDP) packet.

11. The method according to claim 7, further comprising:

receiving a request for an Internet Protocol (IP) address over the WLAN from the WLAN client terminal;

assigning an IP address to the WLAN client terminal, wherein the IP address assigned to the WLAN client terminal is derived from the second mobile station's own IP address by setting the fourth octet to an available number;

receiving another request for an IP address over the WLAN from the second mobile station; and assigning another IP address to the second mobile station, wherein the IP address assigned to the second mobile station is derived from the second mobile station's own IP address by setting the third octet to an available number.

12. The method according to claim 7, further comprising:

receiving a third data packet targeting the WLAN client terminal forwarded by the second mobile station via the WLAN;

receiving a fourth data packet targeting the WLAN client terminal transmitted via the connection with a mobile network;

assembling the third data packet and the fourth data packet in a sequence; and sending the third data packet and the fourth data packet to the WLAN client terminal via the WLAN, wherein the third data packet and the fourth data packet are from the internet host.

* * * * *